Figure 1:
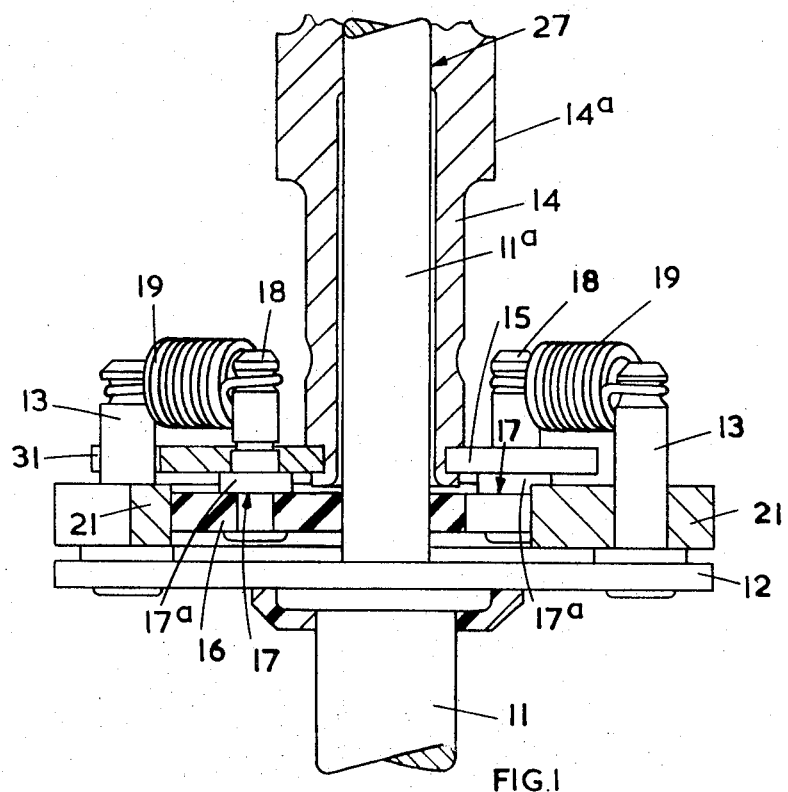

United States Patent [19]
Cooksey et al.

[11] 3,861,171
[45] Jan. 21, 1975

[54] CAM ASSEMBLY

[75] Inventors: William Harold Cooksey; Brian William Cleaver, both of Walsall; Walter Joseph Groom, Sutton Coldfield, all of England

[73] Assignee: Joseph Lucas (Electrical) Limited, Birmingham, England

[22] Filed: Jan. 15, 1973

[21] Appl. No.: 323,385

[30] Foreign Application Priority Data
Jan. 15, 1972 Great Britain...................... 2022/72

[52] U.S. Cl................................ 64/25, 123/139 AP
[51] Int. Cl............................................. F16d 5/00
[58] Field of Search........ 64/25; 123/146.5, 139 AP

[56] References Cited
UNITED STATES PATENTS

| | | | |
|---|---|---|---|
| 1,155,372 | 10/1915 | Rhoades | 64/25 |
| 2,009,935 | 7/1935 | Mallory | 64/25 |
| 2,060,556 | 11/1936 | Davis, Jr. | 64/25 |
| 2,219,480 | 10/1940 | Hartzell et al. | 64/25 |
| 2,533,755 | 12/1950 | Barge | 64/25 |
| 3,045,458 | 5/1962 | Campbell et al. | 64/25 |

*Primary Examiner*—Samuel Scott
*Assistant Examiner*—Randall Heald
*Attorney, Agent, or Firm*—Holman & Stern

[57] ABSTRACT

A cam assembly for an ignition distributor includes a driven shaft rotatably supporting a cam shaft. A first plate is secured to the cam shaft and a second plate generally parallel with the first plate is secured to the driven shaft. There is provided a centrifugal mechanism which includes a control weight pivotally mounted on the second plate for movement about an axis parallel to the axis of the driven shaft, the control weight engaging a cam form provided on a cam member secured to the first plate. The centrifugal mechanism couples the driven shaft and the cam shaft so that the cam shaft rotates with the driven shaft and alters the angular position of the cam shaft relative to the driven shaft in accordance with the speed of rotation of the assembly. A tension spring is coupled at one end to the first plate and coupled at its other end to the second plate, the spring being coupled to the first plate by way of a post secured to the first plate the post further defining a rivet securing the cam member to the first plate. The spring urges the cam shaft to a rest position relative to the driven shaft. The cam shaft has therein a bore through which a portion of the driven shaft extends. There is a clearance between said portion of the driven shaft and the wall of the bore in the cam shaft except at that region of the cam shaft where the cam shaft is engaged in use by a cam follower. The engagement of the wall of the bore, in said region, with the driven shaft defines a first bearing for the cam shaft on the driven shaft, and a second bearing for the cam shaft on the driven shaft is defined by the wall of an aperture in the cam member secured to the first plate, said portion of the driven shaft extends through the aperture in the cam member to provide the second bearing.

5 Claims, 4 Drawing Figures

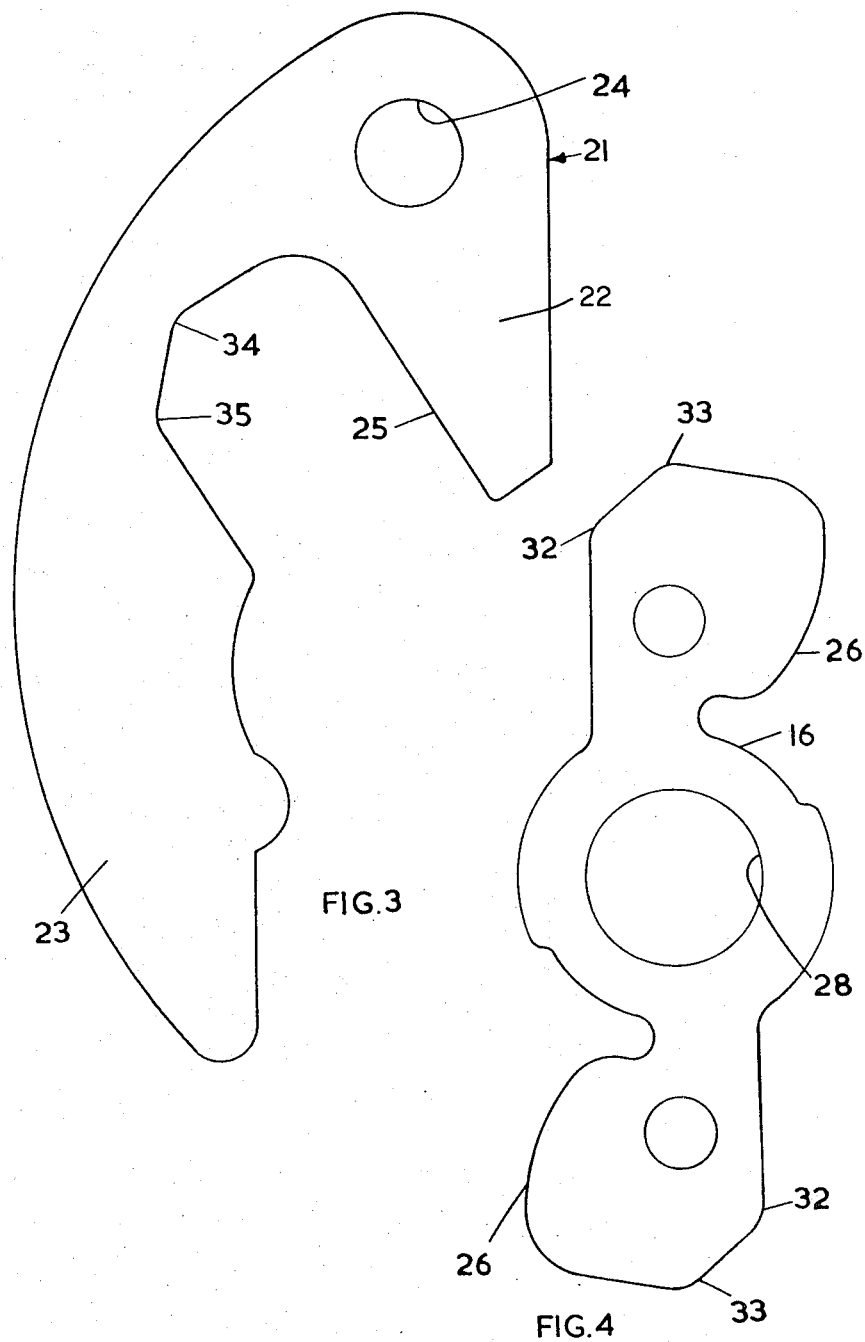

CAM ASSEMBLY

This invention relates to a cam assembly, for an ignition distributor.

A cam assembly according to a first aspect of the invention includes a driven shaft, a cam shaft rotatably coupled to said driven shaft, a first plate secured to the cam shaft, a second plate generally parallel with said first plate and secured to the driven shaft, a centrifugal mechanism including a control weight pivotally mounted on one of the pair of plates defined by said first and second plates, for movement of an axis parallel to the axis of the driven shaft, and engaging a cam form provided on a cam member secured to the other of said pair of plates, the centrifugal mechanism coupling the driven shaft and the cam shaft so that the cam shaft rotates with the driven shaft, and altering the angular position of the cam shaft relative to the driven shaft in accordance with the speed of rotation of the assembly and a tension spring coupled at one end to said one plate, and coupled at its other end to said other plate, the tension spring being coupled to said other plate by way of a post secured to said other plate, said post further defining a rivet securing said cam member to said other plate, and the spring urging the cam shaft to a rest position relative to the driven shaft.

Preferably, said one end of said spring is coupled to said one plate by way of a post secured to said one plate, said post constituting the pivot of the control weight.

Desirably the assembly includes a second control weight pivotally mounted on said one plate for movement about an axis parallel to the pivot axis of the first mentioned control weight, and engageable with a cam form provided on a second cam member secured to said other plate, a second tension spring coupled at one end to said one plate, and coupled at its other end to said other plate by way of a post secured to said other plate, said post further defining a rivet securing said second cam member to said other plate.

Desirably the first mentioned cam member, and said second cam member are parts of a common cam plate.

A cam assembly according to a second aspect of the invention includes a driven shaft, a hollow cam shaft rotatably mounted on said driven shaft, a first plate secured to the cam shaft, a second plate generally parallel with the first plate and secured to the driven shaft, and a centrifugal mechanism coupling the driven shaft and the cam shaft so that the cam shaft rotates with the driven shaft, the centrifugal mechanism altering the angular position of the cam shaft relative to the driven shaft in accordance with the speed of rotation of the assembly, the centrifugal mechanism including a control weight pivotally mounted on the second plate for movement about an axis parallel to the axis of the driven shaft, and engaging a cam form carried by a cam plate secured to the first plate, and there being a clearance between the wall of the bore in the cam shaft and a portion of the driven shaft which is received therein, with the exception of that region of the bore adjacent the portion of the cam shaft which is engaged in use by a cam follower, the engagement of the wall of the bore with the driven shaft in said region defining a first bearing for the cam shaft on the driven shaft, and a second bearing for the cam shaft on the driven shaft being defined by a region of said cam plate having therein an aperture through which said portion of the driven shaft extends.

Preferably the assembly includes a second control weight pivotally mounted on the second plate for movement about an axis parallel to the pivotal axis of the first mentioned control weights, the pivotal axes being on opposite sides of the driven shaft axis respectively, and a second cam form provided on said cam plate and engaged by said second control weight.

Conveniently resilient means urges the cam shaft angularly relative to the driven shaft to a rest position, said resilient means comprising a pair of tension springs each spring being anchored at one end to the first plate and at the other end to the second plate.

Desirably said one end of the springs are anchored to the first plate by way of respective posts which include integral rivets whereby the cam plate is secured to the first plate.

Conveniently said other ends of the springs are anchored to the second plate by way of posts upstanding from the second plate, said posts constituting the pivots of the control weights.

Figure 2:
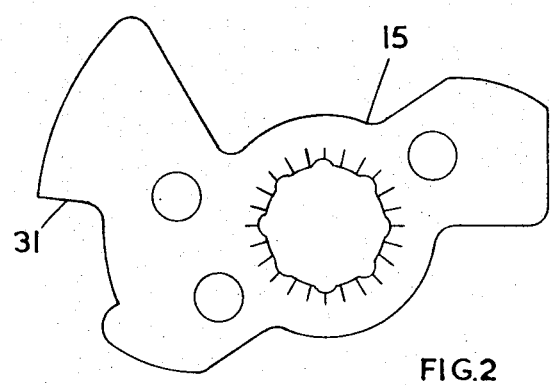

One example of the invention is illustrated in the accompanying drawings wherein FIG. 1 is a sectional view of a cam assembly for an ignition distributor, FIG. 2 is a plan view of one of the plates shown in FIG. 1 in section, FIG. 3 is a plan view to an enlarged scale of one of the control weights seen in FIG. 1, and FIG. 4 is a plan view also to an enlarged scale of the cam plate of the arrangement shown in FIG. 1.

Referring to the drawings, the cam assembly includes a driven shaft 11 which in use is journalled for rotation within the casing of an ignition distributor, and is driven from the engine of the vehicle utilizing the distributor. Adjacent one end of the driven shaft 11 includes a portion 11a of reduced cross section, and secured to the driven shaft 11 at the junction of the portion 11a and the remainder of the shaft is a plate 12. The plate 12 extends at right angles to the axis of the shaft 11 and upstanding from the plate 12 are a pair of diametrically opposed pivot posts 13.

The assembly further includes a hollow cam shaft 14 having a portion 14a intermediate its ends, the portion 14a constituting a cam which in use is engaged by a cam follower of the contact breaker assembly of the ignition distributor. The portion 11a of the shaft 11 extends within the axial bore of the cam shaft 14. At its end remote from the portion 14a the shaft 14 has secured thereto a plate 15 the plate 15 extending at right angles to the axis of the cam shaft 14, and so being parallel to the plate 12 in the assembly. Secured to the plate 15 and positioned between the plate 15 and the plate 12 is a cam plate 16. The cam plate 16 is secured to the plate 15 by means of a pair of rivets 17 each of which includes a region 17a of increased diameter acting as a spacer to space the plate 16 from the plate 15. The rivets 17 extend through the plate 15, and include integral posts 18 projecting from the face of the plate 15 remote from the plate 16. Since each of the rivets 17 extend through a pair of plates, and each rivet has a portion 17a presenting parallel surfaces to the two plates respectively then provided the apertures in the two plates 15, 16 are correctly positioned the posts 18 will extend from the surface of the plate 15 at right angles to the plate 15, that is to say parallel to the axis of the drive shaft 11. The posts 13 are parallel to the posts 18, but are angularly displaced therefrom. Extending between each post 13 and the adjacent post 18 is a helically wound tension spring 19 the two springs 19 serving to urge the cam shaft 14 together with the plates 15, 16 to move angularly relative to the shaft 11 and the plate 12 about the axis of the shaft 11.

Pivotally mounted on each post 13 and extending between the plates 12, 15 is a respectively control weight 21. The control weights 21 are identical, and each is generally in the form of a bell crank lever, each control weight 21 including a short limb 22 and a longer limb 23 disposed at an angle to the short limb 22. Adjacent the junction of the limbs 22, 23 each control weight is formed with a bore 24 through which the respective pivot post 13 extends. The control weights 21, and the cam plate 16 are formed from hardened steel. The end regions of the plate 16 define cam members each having a cam surface 26 and the arrangement is such that a flat, outer surface 25 of each control weight abuts against a respective cam surface 26 of the cam plate 16. The action of the springs 19 in moving the cam shaft 14 together with the plates 15, 16 angularly relative to the shaft 11 and the plate 12 ensures that the surfaces 25 of the two control weights 21 abut the surfaces 26 of the cam plate 16.

The axial bore of the cam shaft 14 is of larger diameter than the portion 11a of the driven shaft 11 throughout the majority of its length, so that a clearance exists between the portion 11a and the wall of the bore of the cam shaft 14. However, adjacent the portion 14a of the cam shaft the bore of the cam shaft is of diameter substantially equal to the diameter of the portion 11a defining a first bearing for the cam shaft on the driven shaft. The cam plate 16 defines a second bearing for the cam shaft on the driven shaft, the cam plate 16 extending diametrically, and being provided with a centrally disposed, circular, aperture 28 of diameter substantially equal to the diameter of the portion 11a of the driven shaft 11, and through which the portion 11a extends.

It will be appreciated, that as the assembly is then rotated then the limbs 23 of the control weights 21 will tend to move outwardly, thereby pivoting the control weights about their respective pivot posts 13. Thus the surfaces 25 of the control weights will roll around the shaped cam surfaces 26 the cam plate 16 and the shape of the cam surfaces 26 is so chosen that the movement of the control weights 21 will displace the plate 16 and therefore the cam shaft 14 angularly relative to the driven shaft 11 about the axis of the driven shaft 11, against the action of the springs 19. The cam surfaces 26 are shaped to produce predetermined angular displacements of the shaft 14 relative to the shaft 11 for given rotational speeds of the assembly, it being appreciated, that the angular movement of the cam shaft 14 relative to the driven shaft 11 will alter the ignition timing of the internal combustion engine utilising the distributor. The range of movement of the cam shaft under the action of the centrifugal mechanism is limited in one direction by the weights engaging one another and a resilient abutment member encircling the shaft 11, and in the other direction by a stop 31 on the plate 15 engaging one of the posts 13. Moreover, the radii of the corners 32, 33 on the cam plate 16 and their counterparts 34, 35 on the weights 21 are so chosen that throughout the range of movement of the weights relative to the cam plate there is a minimum clearance between the weights and the cam plate consistent with unimpeded operation of the mechanism. The surface 25 of the weights and the cam forms 26 otherwise remain in contact by virtue of the springs 19 opposing the centrifugal force of the weights. The minimisation of the clearance in this manner reduces the risk of rattling of the components of the mechanism in use.

We claim:

1. A cam assembly, for an ignition distributor, including a driven shaft, a hollow cam shaft rotatably mounted on said driven shaft, a first plate secured to the cam shaft, a second plate generally parallel with the first plate and secured to the driven shaft, and a centrifugal mechanism coupling the driven shaft and the cam shaft so that the cam shafts rotates with the driven shaft, the centrifugal mechanism altering the angular position of the cam shaft relative to the driven shaft in accordance with the speed of rotation of rotation of the assembly, the centrifugal mechanism including a control weight pivotally mounted on the second plate for movement about an axis parallel to the axis of the driven shaft, and engaging a cam form carried by a cam plate secured to the first plate, and there being a clearance between the wall of the bore in the cam shaft and a portion of the driven shaft which is received therein, with the exception of that region of the bore adjacent the portion of the cam shaft which is engaged in use by the cam follower, the engagement of the wall of the bore with the driven shaft in said region defining a first bearing for the cam shaft on the driven shaft, and a second bearing for the cam shaft on the driven shaft being defined by a region of said cam plate having therein an aperture through which said portion of the driven shaft extends.

2. An assembly as claimed in claim 1 further including a second control weight pivotally mounted on the second plate for movement about an axis parallel to the pivotal axis of the first mentioned control weight, the pivotal axes being on opposite sides of the driven shaft axis respectively, and a second cam form provided on said cam plate and engaged by said second control weight.

3. An assembly as claimed in claim 1 wherein resilient means urges the cam shaft angularly relative to the driven shaft to a rest position, said resilient means comprising a pair of tension springs, each spring being anchored at one end to the first plate and at the other end to the second plate.

4. An assembly as claimed in claim 3 wherein said one ends of the springs are anchored to the first plate by way of respective posts which include integral rivets whereby the cam plate is secured to the first plate.

5. An assembly as claimed in claim 3 wherein said other ends of the springs are anchored to the second plate by way of posts upstanding from the second plate, said posts constituting the pivots of the control weights.

* * * * *